United States Patent

[11] 3,625,419

| [72] | Inventor | Daniel Barron |
| | | 9326 Edmonston Road, Greenbelt, Md. 20770 |
| [21] | Appl. No. | 33,399 |
| [22] | Filed | Apr. 30, 1970 |
| [45] | Patented | Dec. 7, 1971 |

[54] SONAR SLIDE RULE
3 Claims, 4 Drawing Figs.

[52] U.S. Cl. .................................................. 235/88,
235/61 NV
[51] Int. Cl. ...................................................... G04b 37/00
[50] Field of Search ........................................ 235/78, 88, 70 R, 61 B, 84, 61 NV, 89

[56] References Cited
UNITED STATES PATENTS
| 2,193,280 | 3/1940 | Gunning ..................... | 235/70 X |
| 2,853,236 | 9/1958 | Culbertson ................. | 235/61 B |
| 3,266,721 | 8/1966 | Barron ....................... | 235/61 NV |

*Primary Examiner*—Richard B. Wilkinson
*Assistant Examiner*—Stanley A. Wal
*Attorneys*—R. S. Sciascia, Arthur L. Branning, J. G. Murray and M. L. Crane

ABSTRACT: This device is for determining the sonar range to an underwater target by a sonar operator. The device comprises a plurality of discs operative relative to each other in a relationship which is a function of thermal conditions, type of equipment, wave height, probability of detection and other oceanographic conditions to determine sonar range.

INVENTOR
DANIEL BARRON 3,625,419

SONAR SLIDE RULE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, range has been determined by a sonar operator by use of prepared tables, diagrams, large computers, etc. wherein the sonar operator obtains values and sets the values into an expensive computer which computes the range.

SUMMARY OF THE INVENTION

The device of this invention is of simple construction comprising several engageable discs or dials upon which information has been placed for rotation relative to each other. BT information is obtained from a bathythermograph and converted into sound velocity. The value obtained is then used for operation of the discs in order to determine sonar range. The device is operable for anyone of four different models of sonar equipment and is provided with separate values for the different types so that one may determine the range for either type.

It is therefore an object of the present invention to provide a simple hand operated computer for determining sonar range.

Another object is to provide a device for determining range which may be carried out by unskilled as well as skilled operators.

Still another object is to provide a simple computer which may be used for determining range for use with four different models of sonar equipment.

Other and more specific objects of this invention will become apparent upon a careful consideration of the following drawings.

DESCRIPTION OF THE INVENTION

Figure 1:
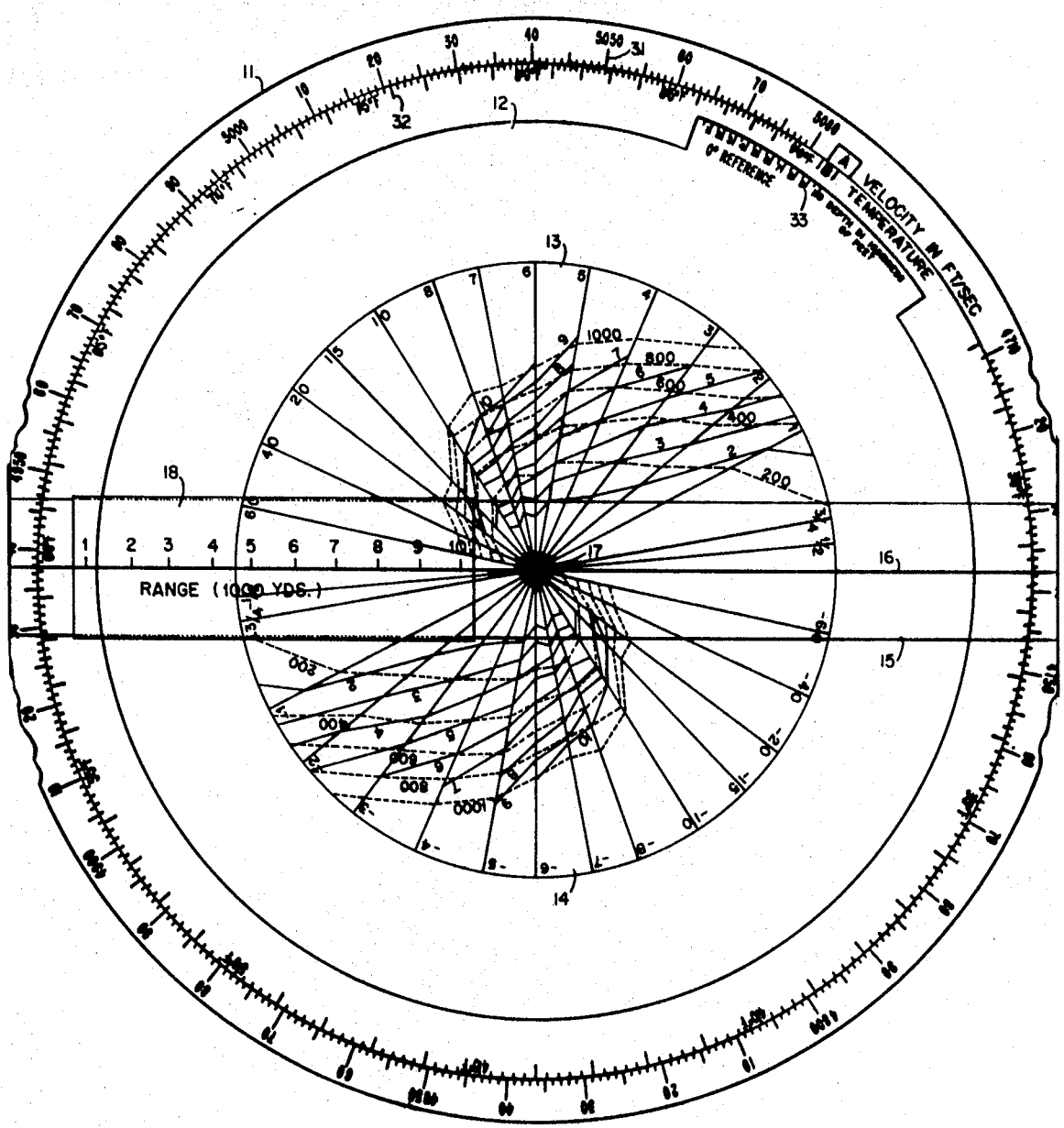
FIG. 1 illustrates the relationship of the elements for determining range using parameters of the sea.
Figure 2:
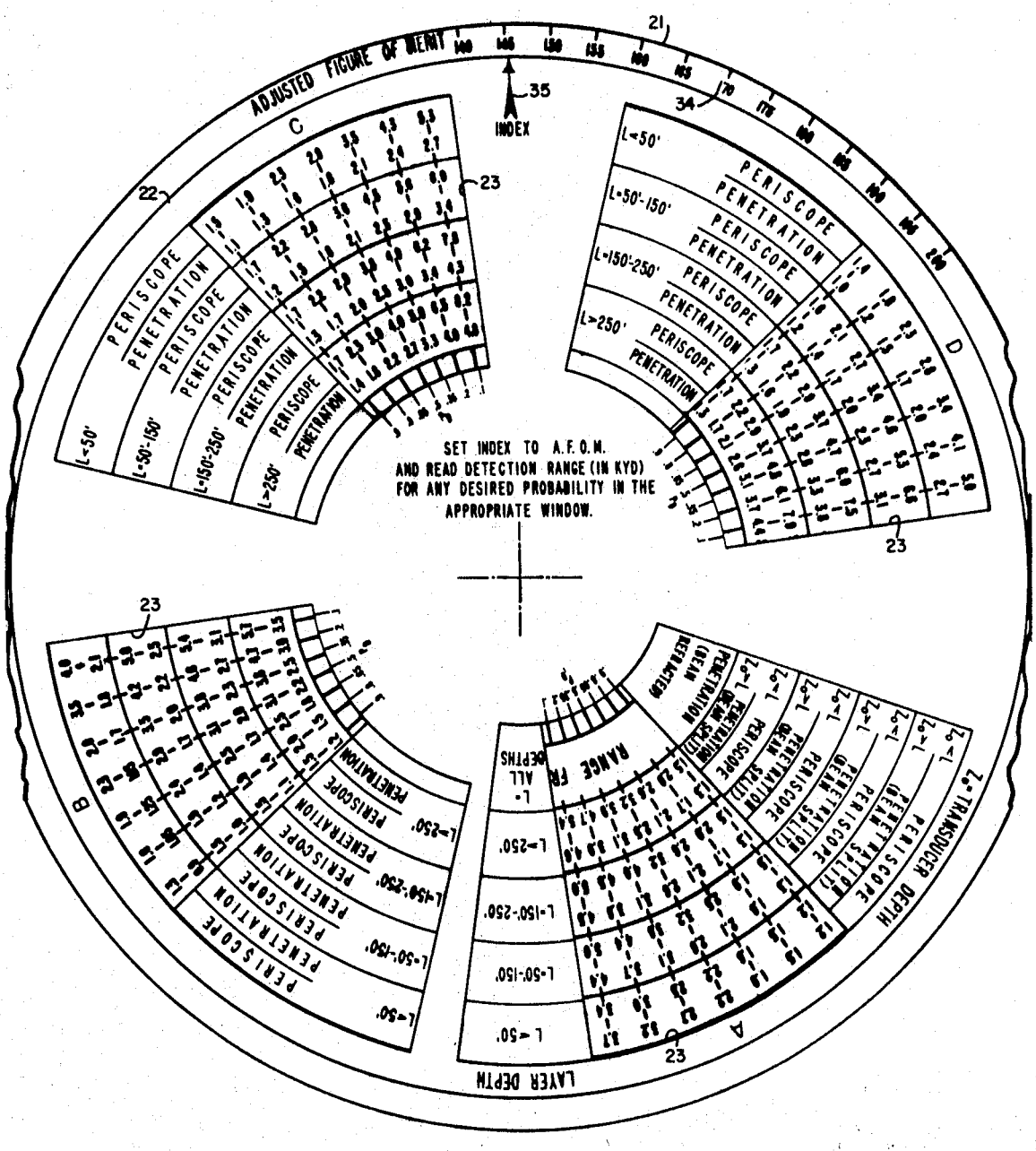
FIG. 2 illustrates the relationship of elements for indicating detection range of various types of sonar detection equipment.
Figure 3:
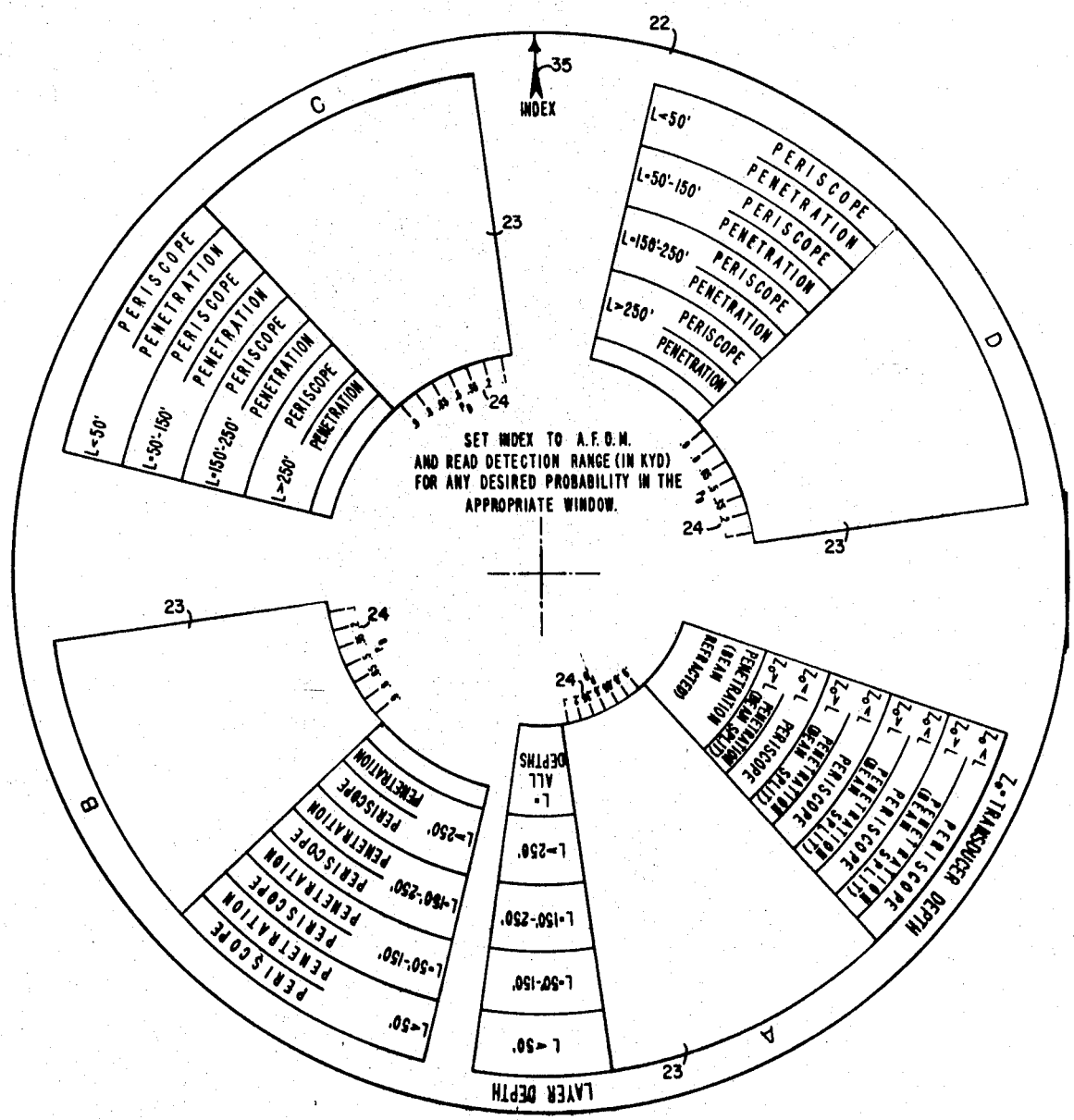
FIG. 3 illustrates the range values for different types of sonar equipment for different transducer depths.
Figure 4:
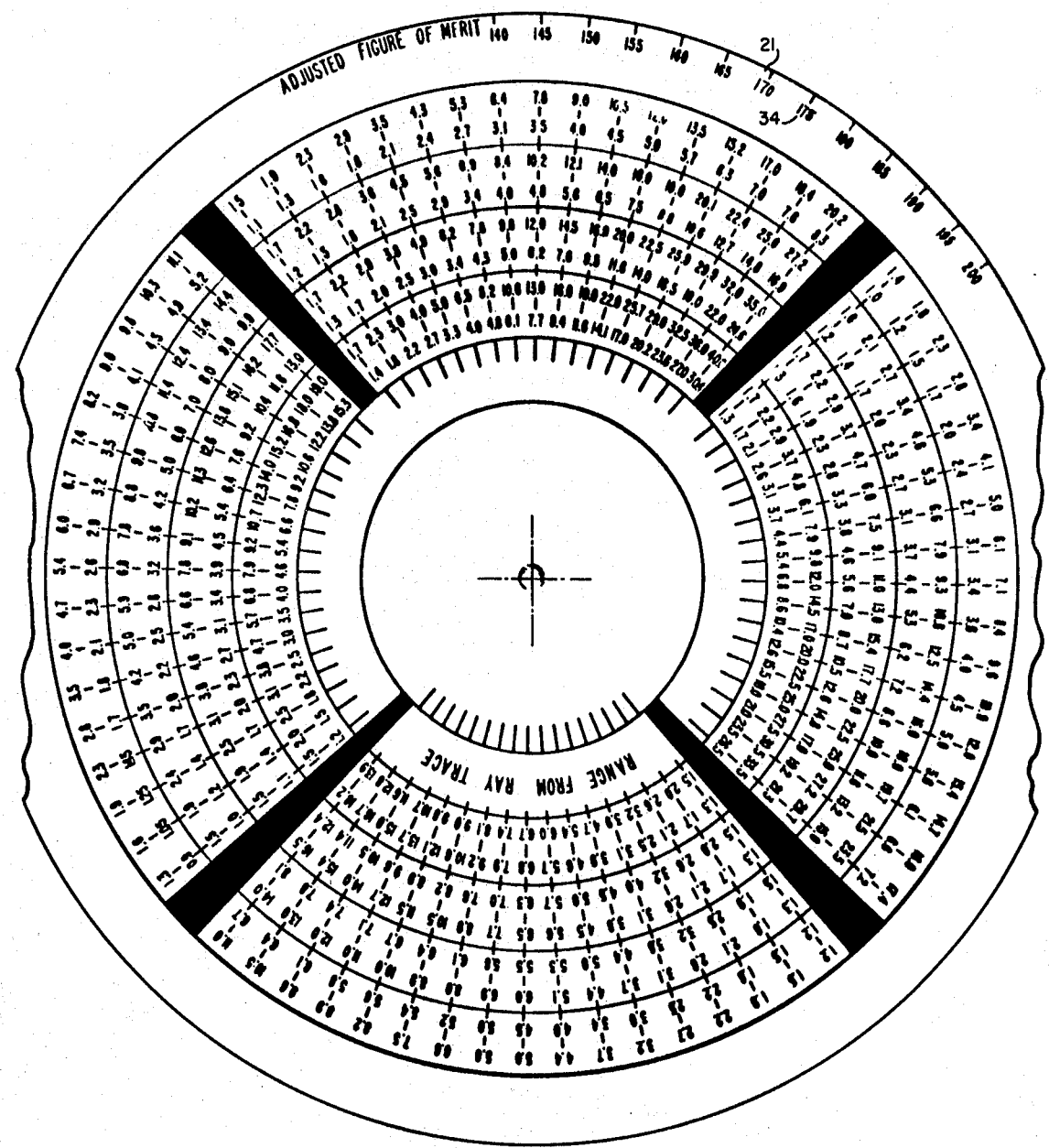
FIG. 4 illustrates an element including the different transducer depth information for different types of sonar equipment corresponding to the different range values shown on the element of FIG. 3.

Now referring to the drawing, there is shown by illustration a circular device having relative movable parts which are related to each other for determining sonar range to an underwater target as a function of the thermal conditions, type of equipment, wave height, probability of detection as well as other oceanographic conditions. As shown, the device has rotatable discs on each side, front and back, each of which rotate independent of each other. The front side includes four discs 11–14 and two relatively movable cursors 15 and 18. The back side includes two relatively movable discs 21 and 22.

Disc 11 includes velocity vs temperature scales wherein the outer scale 31 indicates velocity in ft./sec., with the innermost scale 32 indicating temperature in degrees Fahrenheit. Disc 12 is a pressure correction scale 33 having scale factors from 0 to 10 thereon representing depth in hundredths of feet. The correction scale provides a correction in velocity per foot for the depth at which the transducer is located. It is noted that the deeper the transducer is located the greater is the velocity of sound in the water. Disc 13 is a transducer positive gradient scale formed by lines extending from the mid point of the device outwardly wherein each line represents a velocity gradient (ft./sec./100 ft.) for transducer depths up to 1000 feet. The velocity gradient values illustrated extend from 0, ½, ¾, 1, 2, etc. up to 60. The spacing of the lines are determined from well known formulas found in books on sound such as Fundamentals of Sound by Horton, 2nd edition, United States Naval Institute, Annapolis, Md., 1959. The numbers 0– 10 designated by the solid lines represent angles that sound waves will make when going from one layer to another at the particular depth of the layer. The numbers from 0 to 1000 illustrated by the dashed lines indicate the depth of the sound ray within the water.

Disc 14 is made the same as disc 13 only disc 14 is for negative velocity gradients wherein the velocity gradients are designated by use of a negative sign. A hairline cursor 15 with the line 16 extending across the device through the center is held in place by a center "post" 17 along with the discs 11–14 such that the discs and cursor may be rotated relative to each other. A range cursor 18 is slidably secured to the hairline cursor such that it will slide along the hairline. The range cursor is calibrated in 1,000 yards from 1 to 10. The spacing depends on the diameter of the device and is determined from the scale factor desired for the depth and range axis.

The opposite side of the device comprises two separate discs 21 and 22. Disc 21 is the bottom disc and contains thereon power limited range values for different types of sonar equipment at different depths. Values for four such sonar equipment are given. Disc 21 also includes along its outer edge equally spaced values for an adjusted figure of merit which is the effective power of the source of transducer. As shown, the values indicated on the disc 21 are equally spaced and aligned circularly and radially. Disc 22 overlays disc 21 and includes windows 23 in each of four quadrants through which a portion of the data on disc 21 may be observed. The windows have sufficient width to expose seven radial columns of data each of which are aligned radially with different percents of probability of detection as shown at 24. Adjacent the windows corresponding to the data on the circular segments, there is shown, values for different layer depths. For each different layer depth there are shown on disc 21 different values of range for the periscope depth and penetration for each of the different layer depths. The disc 22 has thereon an index arrow directed radially outward at the outer edge. The index is positioned between equipment C&D of different sonar type and the adjusted figure of merit scale is placed such that when the index arrow is pointed toward the lowest value on the adjusted figure of merit scale, the first six rows of data on the disc 23 will be visible and when the index arrow is directed toward the highest value on the scale the last six rows of data will be visible for each of the different sonar types. The spacing of the adjusted figure of merit scale is the same as that of the range scale. The index and scale for the adjusted figure of merit could be placed any relative position so long as the correct range data corresponds to the correct sonar equipment. Also the spacing of the probability of detection scale is such that they align with side-by-side values along the radial rows of range information.

The device is assembled such that disc 11–14 are placed one on the other with disc 11 being the inner most disc and 14 the outer most disc. On the back side, disc 21 backs upon disc 11 and disc 22 overlays disc 21. The center post provides support for all of the disc and holds the device together as one complete shipboard sonar slide rule for determining the sonar range to an underwater target as a function of the thermal conditions, type of equipment, wave height, probability of detection and other oceanographic conditions.

In operation of the device, a reading is taken from a Bathythermograph to determine the temperature of the water in the different thermal layers. Assuming the thermal layers to be 0, 200, 400 and 600 ft. with temperature reading of 64°, 64.7°, 61.9°and 62.3° F., respectively, the temperature readings are converted to their corresponding sound velocity by use of the scales on disc 11. Noting on the scale, the sound velocity for the above temperature readings are 4,962, 4,966, 4,950, and 4,953 ft./sec., respectively. Correction for pressure at the different depths indicated must be made; therefore, the zero indicator for the pressure correction scales of disc 12 is set at the noted temperature readings and the corrections are made for pressure. Since 64° F. is at the surface, there is no correction for its velocity, therefore, the corrected velocity readings will be 4,962, 4,970, 4,958 and 4,964, respectively. Using the corrected sound velocity reading, determine the velocity gradient for the first layer. The velocity gradient is found by subtracting the sound velocity at the surface from that at the first layer, that is, 4,962 ft./sec. from 4,970 ft./sec. which is 8 ft./sec./200 yards; however, the velocity gradient is figured for ft./sec./100 yd., therefore, the velocity gradient in the first layer is + 4 ft./sec./100 yd. Align the hairline cursor and range scale with the velocity gradient line previously determined which is 4 ft./sec./100 yd. The transducer is located at the surface, therefore, the depth of the transducer is zero. The first layer is 200 ft., therefore, with the cursor and range scale aligned on radial line 4 of disc 13, place the zero markers of the range scale over the indicated depth value of 200 ft. and read the range at the center of the device to be 2.8 kiloyards. Determine the velocity gradient of the second layer by subtracting 4,958, the sound velocity at 400 ft., from 4,970, the sound velocity at 200 ft., as previously indicated. The velocity gradient is −6 ft./sec./100 yd. While holding the hairline cursor and range indicator along the gradient line 4 on disc 13 rotate disc 14 until the velocity gradient line, −6, lines up with the hairline cursor and the range scale. Assuming the target to be within the second layer at 375 ft., from the surface read off and note the range on disc 14 corresponding with the 175 yd. line which is about 2.0 kiloyards. Adding the two ranges for the two different layer depths one determines that the range to the target at 375 yd. is 4.8 kiloyards. Using side B, set disc 22 such that the index arrow is directed to the adjusted figure of merit, then for the particular type of equipment, layer depth, and probability of detection, note the power limited range value on disc 21. Compare the power limited range value on disc 21 with that previously determined from side A and select the smaller value of the two for the final range of the sonar equipment.

If the target is several layers down or within the third layer at 575 ft. with the same temperatures as set forth above, the above steps are performed excluding the steps set forth in the above example for side B. Since the second layer is 400 ft., the range for the second layer at 400 ft. is 2.3 kiloyards. With the discs 13 and 14 aligned with the cursor, as described above, along gradient line 4 of disc 13 and gradient line −6 of disc 14. The angles are determined by use of the solid lines that cross the gradient lines. For the conditions set forth above, the angle is 4°. This angle is the angle that the ray will enter into the next layer. Determine the velocity gradient for the next layer by subtracting 4,958 from 4,964 which determines the velocity gradient for the third layer to be +3 ft./sec./100 yd. Line up gradient line 3 on disc 13 with the hairline cursor and range scale. While holding the disc 13 in its aligned position, rotate the hairline cursor and range line 180° and set the zero range value on the predetermined angle mark 4, on the velocity gradient line 3 and read off the depth value on disc 13 at the interception of the angle line 4 with the gradient line 3. The depth value is 375 ft. Since the target is located in the third layer at 575 ft. or 175 ft. below the second layer a difference of 200 ft. follow the range value scale to the 200 ft. line, the dashed line on the disc, and measure the range, which is 1 kiloyards. The angle reading 2°, determined from the angle mark is the angle at which the ray will enter the next layer.

Add the range of 1 kiloyard to that previously obtained 2.8 and 2.3 to determine the total range of 6.1 kiloyards to a target in the third layer at 575 ft. Now if there is a fourth layer, the velocity gradient is determined for the fourth layer and the above steps are repeated to determine the range in the fourth layer. All of the different ranges determined are added to obtain the total range from the sonar transducer to the target. The total range thus obtained is then compared to the power limited range from side "B," described above, to obtain final range which is the smaller of the two.

As can be seen from above, the discs 13 and 14 cooperate with each other and the hairline cursor and range scale cursor to determine range from a sonar equipment to an underwater target. The range determined is then related to the power limited range for the equipment used and the probability of detection to determine the best range value to be used. The best range value is the least of the two ranges.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent on the United States is:

1. A device for determining sonar range to an underwater object which comprises:
    first, second, third, and fourth coaxially disposed dials arranged one over the other for pivotable rotation relative to each other,
    a substantially rectangular member rotatable about the center relative to said dials having a center line disposed thereon and a range scale disposed over at least a portion thereof,
    a range scale cursor positioned relative to said center line with the range line lying over said centerline for movement along said centerline,
    said first dial having circular inner and outer corresponding indicia thereon near its outer edge,
    said outer indicia representing sound velocity in ft./sec. and the inner indicia representing temperature in degrees F. for that velocity,
    said second dial including a correction factor for depth relative to the velocity,
    said third and fourth dials including respectively positive and negative gradients represented by radially extending lines on one-half of each of the dials,
    said third and fourth dials including thereon angle and depth scales along each of said gradient lines, and
    said range scale is graduated in thousand yards.

2. A device for determining sonar range as claimed in claim 1, which includes in combination:
    a fifth and sixth dial secured coaxial with said first, second, third, and fourth dials with said fifth dial secured back to back with said first dial and said sixth dial lays over said fifth dial,
    said fifth dial including range information thereon for different types of sonar equipment, and
    said sixth dial including depth information thereon relative to said range information on said fifth dial for each different type of sonar.

3. A device as claimed in claim 2, wherein;
    said sixth dial includes percent of probability indicia thereon relative to said range information on said fifth dial.

* * * * *